(12) United States Patent
Hua et al.

(10) Patent No.: US 7,542,645 B1
(45) Date of Patent: Jun. 2, 2009

(54) AIRLINE OPTICAL FIBER WITH REDUCED MULTIPATH INTERFERENCE AND METHODS OF FORMING SAME

(75) Inventors: Yan Hua, Ft. Worth, TX (US); Elli Makrides-Saravanos, Highland Village, TX (US); Ming-Jun Li, Horseheads, NY (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/077,570

(22) Filed: Mar. 20, 2008

(51) Int. Cl.
*G02B 6/032* (2006.01)
*G02B 6/00* (2006.01)

(52) U.S. Cl. .................. 385/125; 385/123; 385/140

(58) Field of Classification Search .................. 385/123, 385/125, 140
See application file for complete search history.

(56) References Cited

U.S. PATENT DOCUMENTS

2007/0201802 A1* 8/2007 Mihailov et al. ............ 385/125
* cited by examiner

*Primary Examiner*—Kevin S Wood
(74) *Attorney, Agent, or Firm*—Michael E. Carroll, Jr.

(57) ABSTRACT

An airline (AL) optical fiber ("AL fiber") that has an AL region with airlines, with the AL region arranged relative to the fiber core so as to make the fiber bend insensitive. The AL region is capable of supporting one or more higher-order optical modes. One method of reducing multipath interference (MPI) includes accessing a section of the AL fiber and closing at least one of the airlines in the section. This serves to attenuate one or more higher-order modes, which reduces MPI. In one example, the AL fiber has an end section wherein the airlines are filled with a blocking material. An example blocking material is a curable adhesive that is wicked into the airlines via capillary action and then cured when the adhesive reaches a certain depth from the fiber end. In another example, the blocking material is formed by heating the AL fiber section to cause the section to melt and block the airlines, so that the melted AL fiber serves as the blocking material. The AL fiber with reduced MPI is particularly useful as a "jump" fiber, whose length is too short to rely on attenuating higher-order modes via a cable cut-off wavelength.

26 Claims, 8 Drawing Sheets

AIRLINE OPTICAL FIBER WITH REDUCED MULTIPATH INTERFERENCE AND METHODS OF FORMING SAME

BACKGROUND OF THE INVENTION

1. Field of the Invention

The present invention relates to airline optical fibers, and in particular relates to an airline optical fiber with reduced multipath interference (MPI), and methods of forming same.

2. Technical Background

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

Airline (or "air line") optical fibers ("AL fibers") have one or more regions with either aperiodically or periodically arranged small holes or voids, which make the fiber extremely bend insensitive. AL fibers with aperiodically arranged holes are referred to as "random airline" or RAL fibers. Examples of airline optical fibers are described in, for example, U.S. Pat. No. 6,243,522, pending U.S. patent application Ser. No. 11/583,098 filed Oct. 18, 2006, and provisional U.S. patent application Ser. Nos. 60/817,863 filed Jun. 30, 2006; 60/817,721 filed Jun. 30, 2006; 60/841,458 filed Aug. 31, 2006; 60/841,490 filed Aug. 31, 2006; and 60/879,164, filed Jan. 8, 2007 (hereinafter, "the Corning airline fiber patents and patent applications"), all of which are assigned to Corning Incorporated and all of which are incorporated by reference herein.

One type of AL fiber has an annular ring of airlines (the "airline ring") surrounding the core and that extends longitudinally down the length of the fiber. The airline ring has a reduced apparent or average index of refraction because air has an index of refraction of ~1 compared to the surrounding fused silica matrix refractive index of ~1.45. The airline ring is positioned to create a refractive index profile that enables superior bend performance (optically) and significantly smaller minimum bend radius specifications.

One drawback of AL fibers is that the airline ring can trap higher order modes. These higher order modes can cause multi-path interference (MPI) in a fiber system. For an AL fiber longer than about 22 m, MPI is typically not an issue because there is a cable cutoff wavelength of 1260 nm that ensures the higher-order modes are attenuated. However, for short sections of AL fibers ("jump fibers") of less than a few meters in length, MPI can generate power fluctuations and noise that reduce system performance. It is therefore desirable to reduce the MPI that can occur in AL fibers without compromising their superior fiber bending performance.

SUMMARY OF THE INVENTION

An aspect of the invention is a method of forming an airline (AL) fiber that includes an AL region with airlines and an end section, and that has reduced multipath interference (MPI). The method includes preparing an end of the end section of the AL fiber to have open airlines, and introducing a blocking material into the open airlines such that the blocking material serves to attenuate one or more higher-order modes supported by the AL region.

Another aspect of the invention is AL jump fiber having reduced MPI. The AL jump fiber includes an AL region arranged in operable relation to a core region such that the AL jump fiber is substantially insensitive to optical loss due to bending, and wherein the AL region is capable of supporting at least one higher-order optical mode. The AL jump fiber also includes an end section that includes an end, wherein the airlines in the end section are filled with a blocking material so as to substantially attenuate the at least one higher-order mode supported by the AL region so as to reduce the MPI.

Another aspect of the invention is an optical fiber connector that includes the AL fiber as described above, and a ferrule having a ferrule channel, wherein the end section of the AL fiber is held in the ferrule channel.

Another aspect of the invention is a method of optically coupling an AL fiber having an AL region that includes airlines to a second AL fiber that includes a second end section having a second end. The method includes introducing a blocking material into the airlines at a first end section of the AL fiber so as to substantially attenuate at least one higher-order mode supported by the AL region. The method also includes supporting the first end section in a ferrule channel of a ferrule so that a first end of the first end section resides in the ferrule channel. The method also includes supporting the second end section in the ferrule channel so that the second end of the AL fiber interfaces with the first end in the ferrule channel.

Another aspect of the invention is a method of reducing multipath interference in an AL fiber having an AL region with one or more airlines. The method includes accessing a section of the AL fiber, and closing at least one of the airlines in the section, wherein the closing of at least one of the airlines serves to attenuate one or more higher-order modes supported by the AL region.

Another aspect of the invention is a method of reducing multipath interference in an AL fiber having an AL region with an AL refractive index and a cladding region with a cladding refractive index. The method includes accessing a section of the AL fiber. The method also includes causing the AL refractive index in the section to be at least as high as the cladding refractive index.

Additional features and advantages of the invention are set forth in the detailed description that follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description, serve to explain the principles and operations of the invention.

DETAILED DESCRIPTION OF THE PREFERRED EMBODIMENTS

Reference is now made in detail to the present preferred embodiments of the invention, examples of which are illustrated in the accompanying drawings. Whenever possible, the same reference numbers and symbols are used throughout the drawings to refer to the same or like parts.

In the discussion below, the "refractive index profile" is the relationship between refractive index or relative refractive index and waveguide fiber radius. The "relative refractive index percent" is defined as $\Delta(\%)=[(n_i^2-n_c^2)/2n_i^2]\times 100$, where $n_i$ is the maximum refractive index in region i, unless otherwise specified, and $n_c$ is the average refractive index of the cladding region (e.g., the outer cladding region, as discussed below). As used herein, the relative refractive index percent is represented by "Δ" and its values are given in units of "%" unless otherwise specified or as is apparent by the context of the discussion.

In cases where the refractive index of a region is less than the average refractive index of the cladding region, the relative refractive index percent is negative and is referred to as having a "depressed region" or a "depressed index," and is calculated at the point at which the relative refractive index is most negative unless otherwise specified. In cases where the refractive index of a region is greater than the average refractive index of the cladding region, the relative refractive index percent is positive and the region can be said to be raised or to have a positive index.

An "updopant" is herein considered to be a dopant, which has a propensity to raise the refractive index relative to pure undoped silica. A "downdopant" is herein considered to be a dopant, which has a propensity to lower the refractive index relative to pure undoped silica. An updopant may be present in a region of an optical fiber having a negative relative refractive index when accompanied by one or more other dopants, which are not updopants. Likewise, one or more other dopants, which are not updopants, may be present in a region of an optical fiber having a positive relative refractive index. A downdopant may be present in a region of an optical fiber having a positive relative refractive index when accompanied by one or more other dopants, which are not downdopants. Likewise, one or more other dopants, which are not downdopants, may be present in a region of an optical fiber having a negative relative refractive index.

Other techniques to form depressed index regions besides the use of downdopants, such as through the use of microstructures, are used in example embodiments of the present invention and are described in greater detail below. Microstructures include, for example, non-periodic and period holes or airlines, such as photonic crystals.

The "effective area" is defined as:

$$A_{eff}=2\pi(\int f^2 rdr)^2/(\int f^4 rdr),$$

where the integration limits are 0 to ∞, and f is the transverse component of the electric field associated with light propagated in the waveguide. As used herein, "effective area" or "$A_{eff}$" refers to optical effective area at a wavelength of 1550 nm unless otherwise noted.

The mode field diameter (MFD) is measured using the Peterman II method wherein, 2w=MFD, and $w^2=(2\int f^2 rdr/\int [df/dr]^2 rdr)$, the integral limits being 0 to ∞.

The bend resistance of an optical fiber can be gauged by induced attenuation under prescribed test conditions, for example by wrapping one or more turns around a cylindrical mandrel having a constant diameter.

The "volume" of a circular cross-section region is defined by its relative refractive index multiplied its "area," wherein the "area" is defined by the square of its radius. Likewise, the volume of an annular cross-section region is defined by its relative refractive index multiplied by its area as defined by $(r_o^2-r_i^2)$, where $r_o$ is the outer radius and $r_i$ is the inner radius.

Airline fiber

Figure 1:
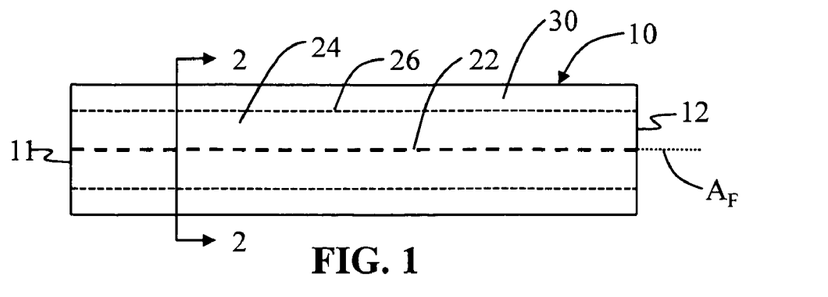
FIG. 1 is a schematic side view of the end section of an example AL fiber showing the different regions of the fiber in phantom.
Figure 2:
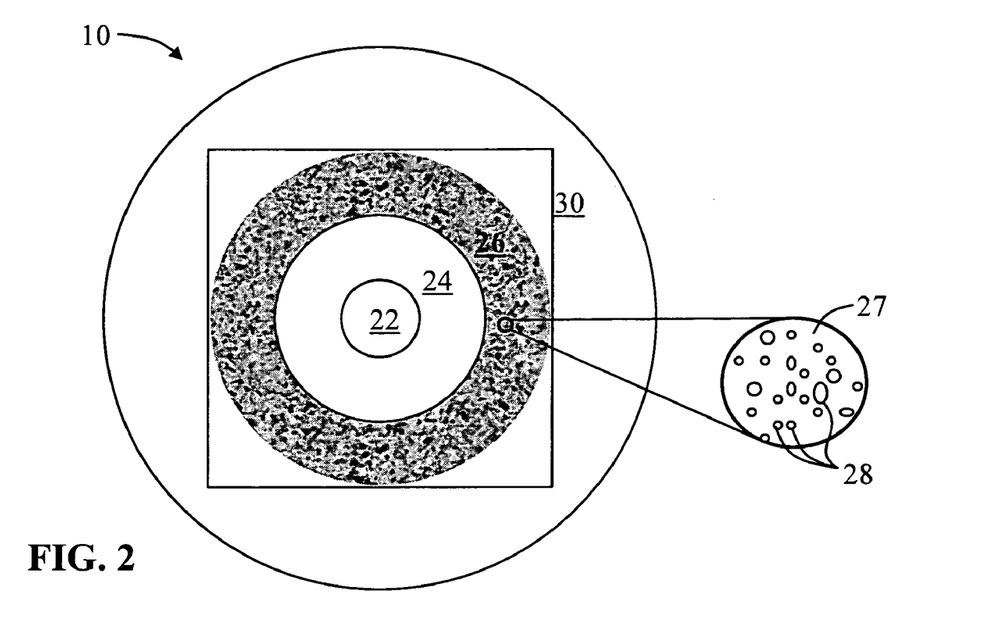
FIG. 2 is a cross-sectional diagram of the AL fiber of FIG. 1 as viewed along the direction 2-2, with the magnified inset showing a close-up view of an example AL region that has randomly arranged voids formed therein.
Figure 3:
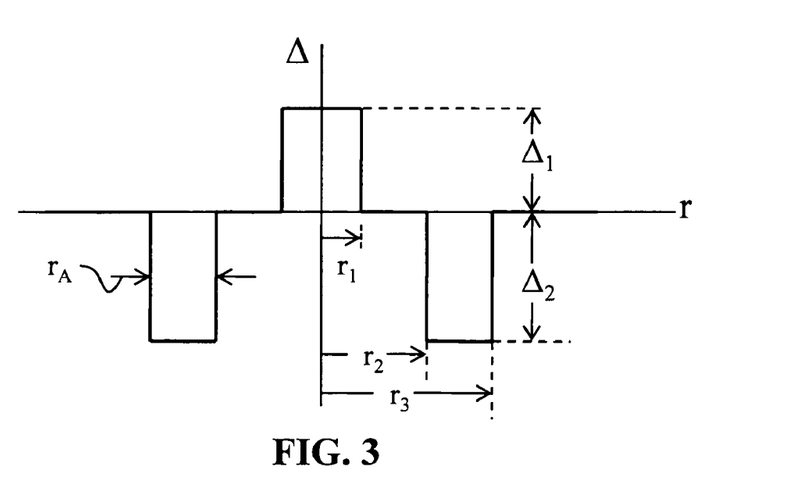
FIG. 3 is a plot of the relative refractive index profile A of the AL fiber of FIG. 2.

FIG. 1 is a schematic side view of a section of an example embodiment of an AL optical fiber ("AL fiber") 10. AL fiber 10 has opposite ends 11 and 12 and a central axis $A_F$. FIG. 2 is a cross-section of AL fiber 10 as viewed along the direction 2-2 in FIG. 1. FIG. 3 plots the relative refractive index profile of the AL fiber of FIG. 2. AL fiber 10 can be, for example, any one of the various types of AL fibers, such as described in the above-mentioned Corning airline fiber patents and patent applications. In an example embodiment, AL fiber 10 includes a core region ("core") 22, an inner cladding region 24 immediately surrounding the core, an annular ("ring") AL region 26 immediately surrounding the inner cladding region 24, and an outer cladding region 30 ("cladding") immediately surround the AL region 26. AL region 26 is arranged relative to core 22 such that it is capable of supporting at least one higher-order optical mode ("higher-order mode") that can lead to MPI.

In an example embodiment, AL region 26 comprises a glass matrix ("glass") 27 having formed therein holes ("airlines") 28, such as the non-periodically disposed holes shown in detail in the magnified inset of FIG. 2. In an example embodiment, glass 27 is fluorine-doped, while in another example embodiment the glass is undoped silica. By "non-periodically disposed" or "non-periodic distribution," it is meant that when one takes a cross-section of the optical fiber (such as shown in FIG. 2), airlines 28 are randomly or non-periodically distributed across a portion of the AL fiber 10. Cross sections similar to FIG. 2 taken at different points along the length of an RAL-type AL fiber 10 will reveal different cross-sectional hole patterns, i.e., various cross-sections will have different hole patterns, wherein the distribution of holes and sizes of holes do not match. That is, the holes are non-periodic, i.e., they are not periodically disposed within the fiber structure. These holes are stretched (elongated) along the length (i.e. in a direction generally parallel to the longitudinal axis) of the optical fiber (and thus have a longer dimension along the length of the fiber), but do not extend the entire length of the entire fiber for typical lengths of transmission fiber. While not wishing to be bound by theory, it is believed that the holes extend less than a few meters, and in many cases less than 1 meter along the length of the fiber.

If non-periodic airlines 28 are employed in AL region 26, it is desirable in one example embodiment that they be formed such that greater than 95% of and preferably all of the holes exhibit a mean hole size in the cladding for the optical fiber which is less than 1550 nm, more preferably less than 775 nm, and most preferably less than about 390 nm. Likewise, it is preferable that the maximum diameter of the holes in the fiber be less than 7000 nm, more preferably less than 2000 nm, and even more preferably less than 1550 nm, and most preferably less than 775 nm. In some embodiments, the fibers disclosed herein have fewer than 5000 holes, in some embodiments also fewer than 1000 holes, and in other embodiments the total number of holes is fewer than 500 holes in a given optical fiber perpendicular cross-section. Of course, the most preferred fibers will exhibit combinations of these characteristics. Thus, for example, one particularly preferred embodiment of optical fiber would exhibit fewer than 200 holes in the optical fiber, the holes having a maximum diameter less than 1550 nm and a mean diameter less than 775 nm, although useful and bend resistant optical fibers can be achieved using larger and greater numbers of holes. The hole number, mean diameter, max diameter, and total void area percent of holes can all be calculated with the help of a scanning electron microscope at a magnification of about 800× and image analysis software, such as ImagePro, which is available from Media Cybernetics, Inc. of Silver Spring, Md., USA.

In an example embodiment, airlines 28 can contain one or more gases, such as argon, nitrogen, or oxygen, or they can contain a vacuum with substantially no gas; regardless of the presence or absence of any gas, the refractive index of AL region 26 is lowered due to the presence of the holes. The holes can be randomly or non-periodically disposed, while in other embodiments the holes are disposed periodically. In some embodiments, the plurality of holes comprises a plurality of non-periodically disposed holes and a plurality of periodically disposed holes. Alternatively, or in addition, as mentioned above the depressed index can also be provided by downdoping the glass in the hole-containing region (such as with fluorine) or updoping one or both of the surrounding regions.

AL region 26 can be made by methods that utilize preform consolidation conditions, which are effective to trap a significant amount of gases in the consolidated glass blank, thereby causing the formation of voids in the consolidated glass optical fiber preform. Rather than taking steps to remove these voids, the resultant preform is used to form an optical fiber with voids, or holes, therein. As used herein, the diameter of a hole is the longest line segment whose endpoints are disposed on the silica internal surface defining the hole when the optical fiber is viewed in a perpendicular cross-section transverse to the optical fiber central axis $A_F$.

Multi-Path Interference (MPI)

MPI happens when more than one mode propagates in a fiber. In most practical cases, the first higher order mode $LP_{11}$ has the lowest loss among the higher order modes. Thus, it is usually sufficient to consider only the $LP_{11}$ mode when examining MPI effects.

Figure 4:
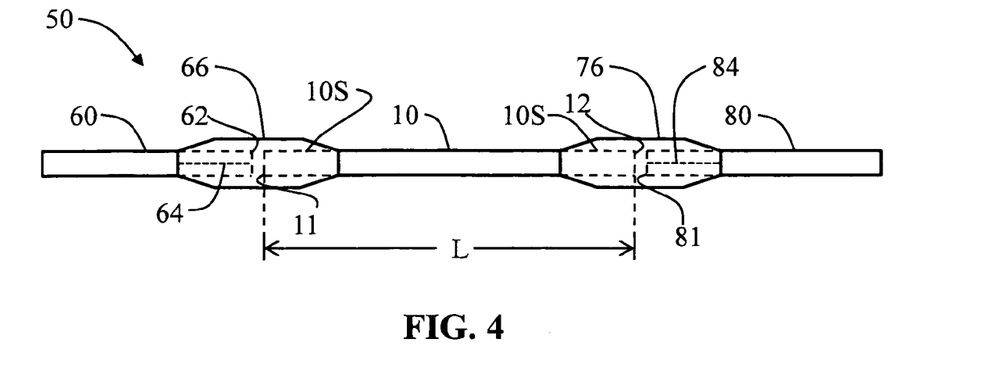
FIG. 4 is a schematic diagram of an optical fiber system having an input (transmitting) fiber, an AL jump fiber, and a receiving (output) fiber, wherein the input fiber and the input end of the AL jump fiber are optically coupled via a first fiber optic connector, and wherein the output fiber and the output end of the AL jump fiber are optically coupled via a second fiber optic connector.

FIG. 4 is a schematic diagram illustrating a fiber optical system 50 that includes an input (transmitting) fiber 60 with an end 62 and a core 64. System 50 also includes a short section (e.g., 1 to 2 m) of AL fiber 10 as an AL jump fiber. System 50 further includes an output (receiving) fiber 80 with an end 81 and a core 84. Input fiber 60 is optically coupled at end 62 to the input end 11 of AL jump fiber 10 via a first fiber optic connector 66, while the output end 12 of the AL jump fiber 10 is optically coupled to end 81 of output fiber 80 via a second fiber optic connector 76.

Suppose that the coupling coefficient of the $LP_{01}$ mode from input fiber 60 to AL jump fiber 10 is $\eta_{01\ 01}^{(1)}$, in first connector 66, and from the AL jump fiber 10 to output fiber 80 is $\eta_{01\ 01}^{(2)}$ in second connector 76. The coupling coefficient from the $LP_{01}$ mode to the $LP_{11}$ is $\eta_{01\ 11}^{(1)}$ in first connector 66, and the coupling coefficient from the $LP_{11}$ to the $LP_{01}$ mode is $\theta_{11\ 01}^{(2)}$ in second connector 76.

The transmission efficiency of the $LP_{01}$ mode is expressed as:

$$\eta = \eta_{01\ 01}^{(1)} \eta_{01\ 01}^{(2)} + \eta_{01\ 11}^{(1)} \eta_{11\ 01}^{(2)} \exp(-\alpha_{11}L) + 2\sqrt{\eta_{0101}^{(1)} \eta_{0101}^{(2)} \eta_{0111}^{(1)} \eta_{1101}^{(2)} \exp(-\alpha_{11}L)} \cos(\Delta\beta L) \qquad (1)$$

where L is the length of the AL jump fiber 10, $\alpha_{11}$ is the attenuation coefficient of the $LP_{11}$ mode, and $\Delta\beta$ is the difference in propagation constant between the $LP_{11}$ and the $LP_{01}$ modes. Eq. (1) indicates that the transmitted power fluctuates with wavelength, depending on the coupling loss, the propagation loss of the higher order modes, and the phase mismatch between the fundamental mode and the higher order mode.

The worst case of the oscillation amplitude is when the coupling efficiencies for connectors 66 and 76 are the same, i.e., $\eta_{01\ 01}^{(1)} = \eta_{01\ 01}^{(2)} = \eta_{01\ 01}, \eta_{01\ 11}^{(1)} = \eta_{11\ 01}^{(2)} = \eta_{01\ 11}$. In this case, the peak-to-peak oscillation amplitude is given by $$\Delta\eta_{pp} = 2\eta_{0101}\eta_{0111}\exp\left(-\frac{\alpha_{11}}{2}L\right) \qquad (2)$$

Eq. (2) shows that the oscillation amplitude is reduced if the attenuation of the $LP_{11}$ mode is increased. The MPI value related to system performance is calculated for the peak-to-peak oscillation by using the following equation $$MPI[dB] = 20\log[0.25(10^{\frac{\Delta[dB]}{10}} - 1)] \qquad (3)$$

In an example embodiment, core 22 has a relative refractive index $\Delta_1$ of about 0.34% and a core radius $r_1$ of about 4 µm (FIG. 3), and AL region 26 has small air holes with an index of 1. The average index of AL region 26 is lower than that of the inner and outer silica cladding regions 24 and 30, which in an example embodiment have the same relative index. In an example embodiment, the average relative index $\Delta_2$ of AL region 26 is $-1.5\% \leq \Delta_2 \leq -0.5\%$, depending on the air fill fraction and wavelength. In an example embodiment, AL region 26 is placed at a radius $r_2$ wherein 8 µm$\leq r_2 \leq$12 µm. Also in an example embodiment, the thickness $r_3$-$r_2$ (i.e., the annular radius $r_A = r_3 - r_2$) of AL region 26 is 2 µm$\leq r_A \leq$5 µm.

While AL region 26 improves the bending loss of the fundamental mode by about two orders of magnitude, it can also trap higher order modes that, for a short piece of AL fiber, such as an AL jump fiber, may remain unattenuated. Although the cable cutoff wavelength $\lambda_{CC}$ for this type of fiber is less than 1260 nm for a 22 m long fiber, the cutoff wavelength for an AL fiber 10 shorter than 22 m may be higher than 1310 nm, which can cause MPI, as explained above.

Figure 5:
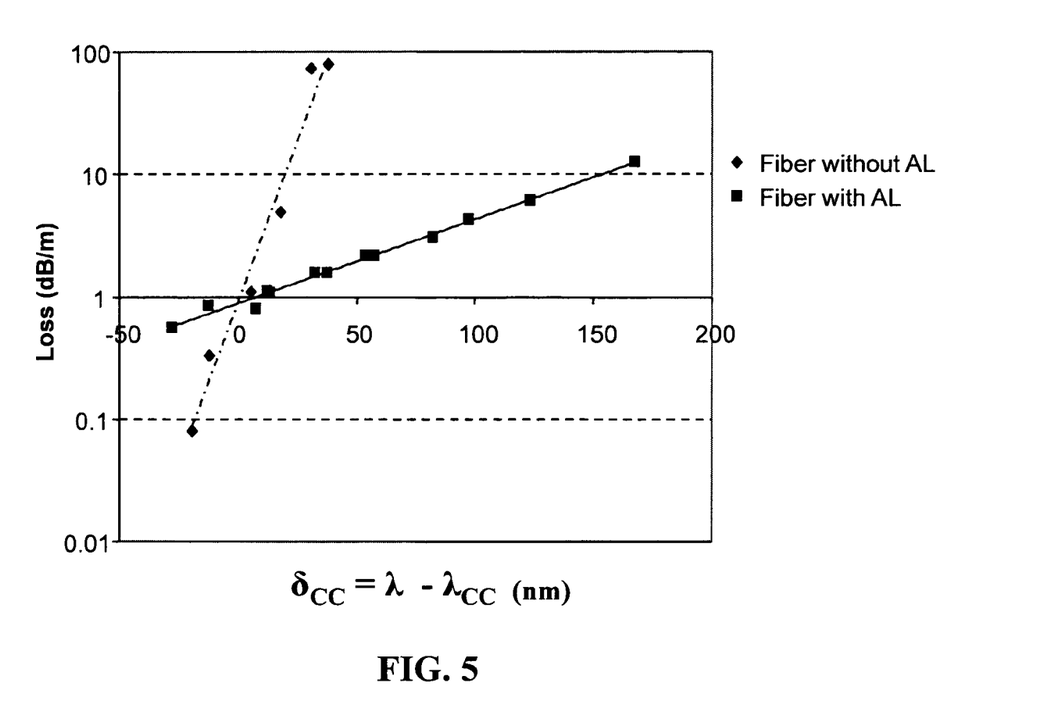
FIG. 5 is a plot of the attenuation (dB/m) of the $LP_{11}$ 1mode as a function of wavelength difference to the cable cutoff wavelength $\delta_{CC}=(\lambda-\lambda_{CC})$ (nm) for AL and single-mode (SML) non-AL fibers.

FIG. 5 is a plot of the attenuation (dB/m) of the $LP_{11}$ mode as a function of wavelength difference to the cable cutoff wavelength $\delta_{CC} = (\lambda - \lambda_{CC})$ (nm) for an AL fiber 10 having random airlines 28 and for a fiber having the same core but without random airlines. The cable cutoff wavelength $\lambda_{CC}$ is defined as the wavelength at which the $LP_{11}$ mode attenuation reaches 19.2 dB for 22 m of fiber. FIG. 5 shows that for the same wavelength difference, the $LP_{11}$ loss of the fiber with random airlines 28 is much lower than the fiber without random airlines. For a cable cutoff wavelength $\lambda_{CC}$=1260 nm, the $LP_{11}$ loss at 1310 nm for fiber with random airlines is 1.9 dB/m versus 402 dB/m for the fiber without random airlines.

Figure 6A:
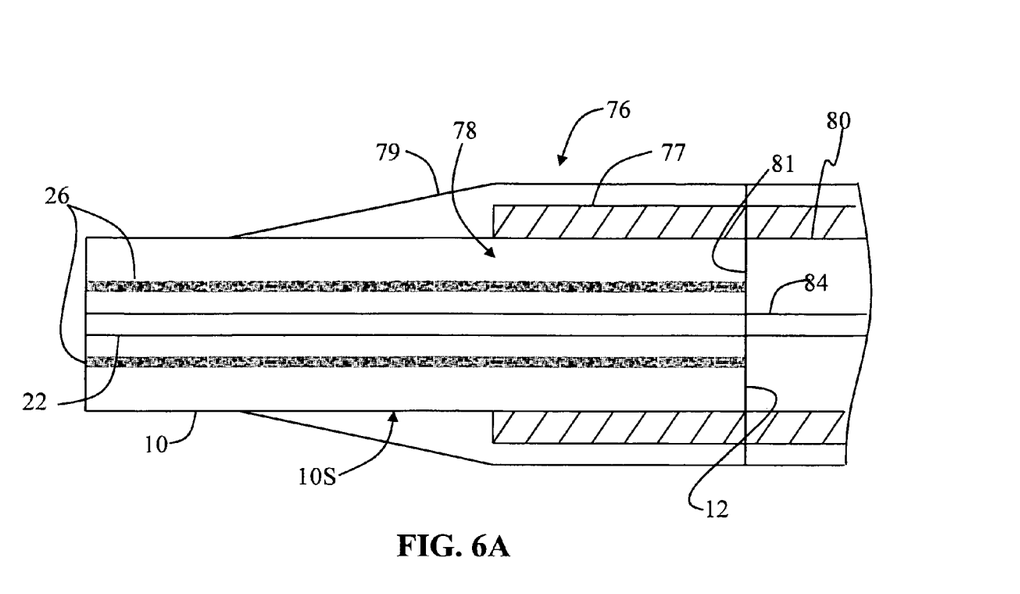
FIG. 6A is a close-up schematic cross-sectional diagram of the optical fiber system of FIG. 4, showing the AL jump fiber with open air lines, and the connector that connects the AL jump fiber to the output fiber.

Eq. (3) indicates that low loss for the $LP_{11}$ mode results in high MPI. Accordingly, the present invention reduces MPI by closing airlines 28. FIG. 6A is a close-up schematic cross-sectional diagram of an example of AL jump fiber 10 at end 12, and connector 76 of optical fiber system 50 of FIG. 4. Connector 76 includes a ferrule 77 with a central channel 78, and a rear housing or "boot" 79 surrounding the ferrule. An end section 10S of AL jump fiber 10 that includes fiber end 12 is held within connector 76 in ferrule channel 78 and is covered by boot 79. Ferrule channel 78 also holds output fiber 80, which in an example embodiment is a non-AL fiber (e.g., is a conventional single-mode fiber). Because ferrule 77 and boot 79 serve to support and protect AL fiber end section 10S, this end section is not subject to severe bending. Consequently, the bending performance of AL jump fiber end section 10S is not of particular concern. This being the case, airlines 28 in AL jump fiber end section 10S can be closed off or otherwise blocked to a depth D with a blocking material 29 at fiber end 12. Various options for blocking material 29 are discussed below.

By closing off airlines 28 at AL jump fiber end section 10S, the attenuation of this section increases, which acts as a higher-order-mode stripper that reduces MPI.

Figure 7:
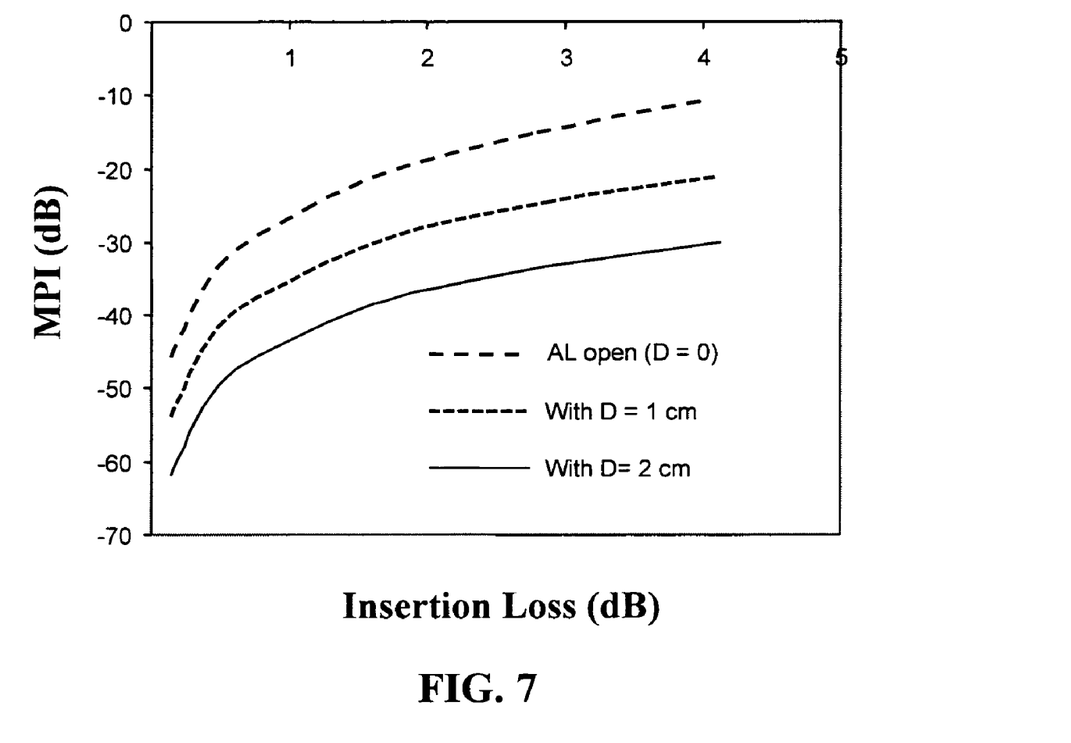
FIG. 7 is a plot of the MPI (dB) as a function of total insertion loss (dB) for three two-meter AL jump fibers with and without closed airlines.

FIG. 7 is a plot of the MPI (dB/m) as a function of total insertion loss (dB/m) for three two-meter AL jump fibers with and without closed airlines 28. The plot in FIG. 7 shows that MPI is reduced by about 10 dB for every 1 cm of depth D to which the airlines are closed. For the jumper fiber having closed airlines to a depth D=2 cm, the MPI is reduced to below –35 dB for a corresponding insertion loss of less than 2 dB.

Figure 8:
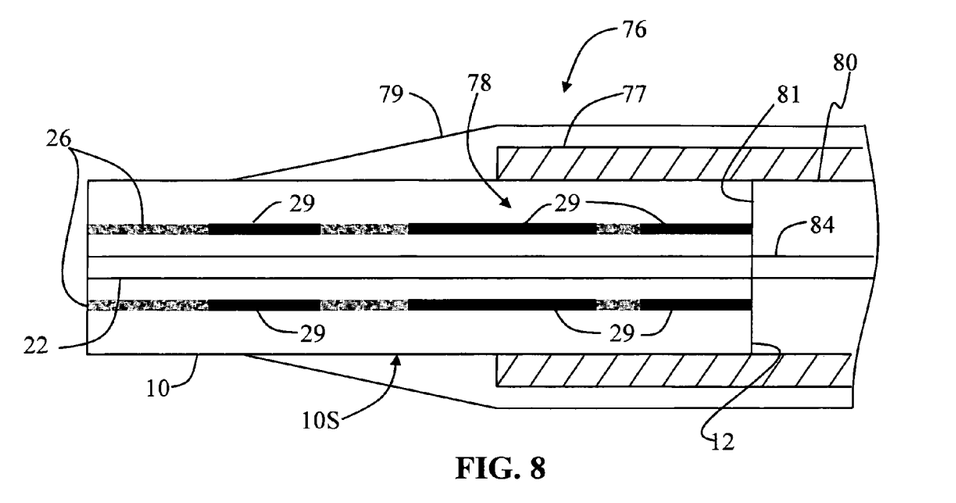
FIG. 8 is similar FIG. 6B, but wherein the blocking material is formed in segments within the airlines.

In an example embodiment, airlines 28 are closed by heating AL fiber end section 10S fiber beyond the fiber's melting point, in which case blocking material 29 is the fiber material itself, e.g., the material making up inner and/or outer cladding regions 24 and 30. Such heating can be performed, for example, by using either an electric arc or a high power laser. Airlines 28 can also be closed off by either closing the airlines in fiber end section 10S with either single segments of blocking material 29 or multiple segments of blocking material, as illustrated in FIG. 8. This can be accomplished, for example, by selective melting of portions of the AL fiber end section 10S.

Liquid Adhesive as a Blocking Material

Another method of blocking airlines 28 is to use a liquid adhesive as blocking material 29. The liquid adhesive is allowed to wick into airlines via capillary action to a depth D. and is then cured, e.g., by exposure to ultraviolet (UV) light, or by heating. In one example embodiment, the liquid adhesive has a refractive index that is matched or is substantially matched to the refractive index (indices) of inner and outer cladding regions 24 and 30. In another example embodiment, the liquid adhesive refractive index is slightly higher than the refractive index (indices) of inner and outer cladding regions 24 and 30. In another example embodiment discussed in greater detail below, the liquid adhesive refractive index is substantially different than the refractive index (indices) of inner and outer cladding regions 24 and 30.

Figure 6B:
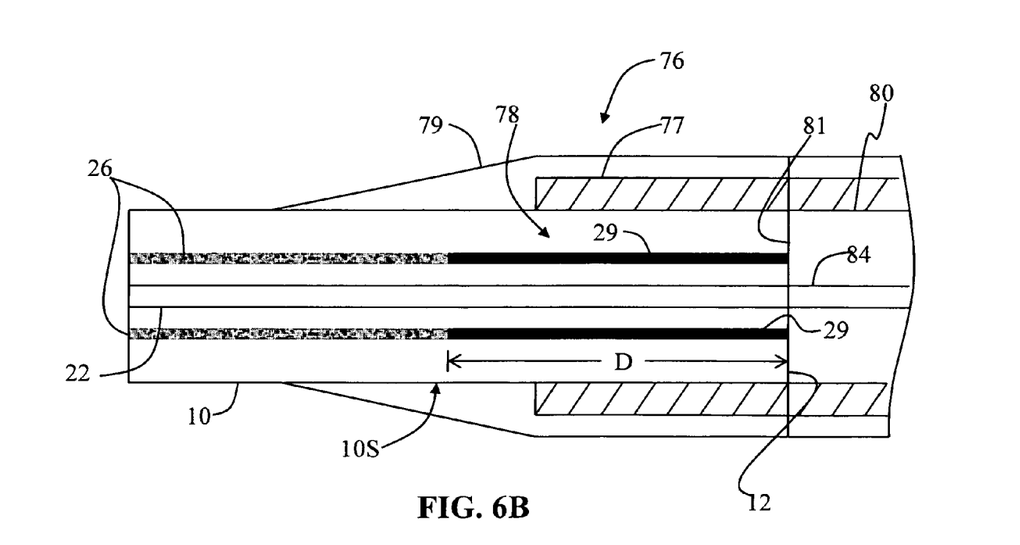
FIG. 6B is the same as FIG. 6A, but wherein the airlines of the AL fiber are blocked with a blocking material to a depth D.

When airlines 28 are closed-ended, the liquid will wick only to a certain depth where the pressure from air trapped inside the airlines balances the force of capillary action and stops the wicking process. Accordingly, in an example embodiment, the wicking process is carried out inside a vacuum so that airlines 28, which are initially open at fiber end 12 (see FIG. 6A and FIG. 6B), also have a vacuum that allows the adhesive liquid to wick farther into the airlines. This vacuum can also be created by heating fiber end 12.

Adhesive liquid is then applied to a fiber end (e.g. fiber end 12) such as by inserting the fiber end into a container of liquid adhesive to be used as blocking material 29. The heat is removed and the capillary action begins. Once the liquid adhesive has wicked to the desired depth D inside airlines 28, fiber end 12 is removed from the adhesive liquid and wiped clean. The liquid adhesive is then cured so that it remains a stable blocking material 29 inside airlines 28.

In an example embodiment, the adhesive is selected to be a glass-bonder and it is preferably formulated to have a lower surface energy than glass 27 in which the airlines are formed. Also in an example embodiment, the adhesive has a low viscosity, and further in an example embodiment is kept warm to lower its viscosity and accelerate the wicking process.

To further enhance the wicking process, in an example embodiment a plasma treatment is used. In another example embodiment, an alcohol (e.g., IPA or ethanol) or acetone is used to wet the inside airlines 28. The fiber is then heated to drive the wetting agent out and create a vacuum within the airlines. The wicking process is then carried out with the select blocking material 29.

For UV curable adhesives, the wicking of the adhesive in the airlines of the fiber is monitored (e.g., with an optical microscope). When airlines 28 are filled to the desired depth D, it is cured, e.g., by using UV light from a UV light source. The above process is readily optimized by controlling the wicking depth D as a function of time and the temperature and viscosity of the adhesive.

Higher Refractive Index Blocking Material

Figure 9:
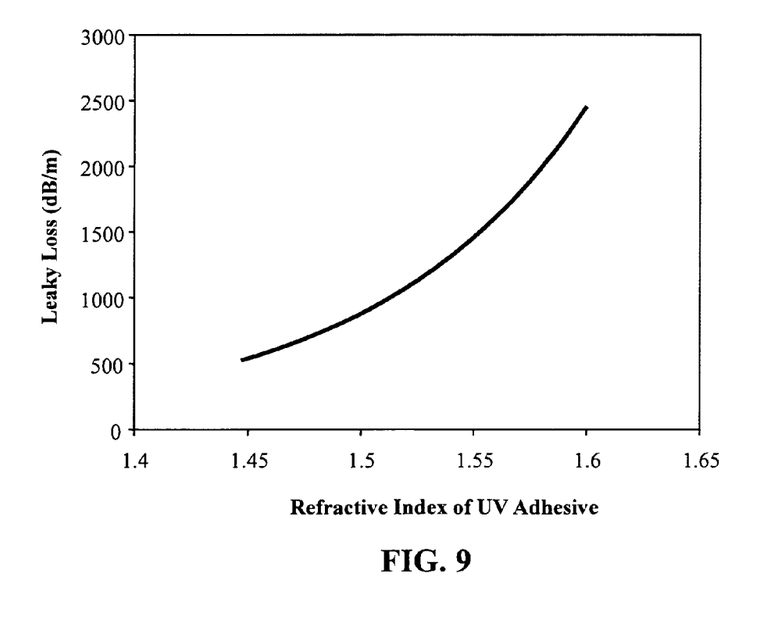
FIG. 9 is a plot of the calculated leaky loss (dB) at 1310 nm as a function of the refractive index of a blocking material in the form of a UV adhesive.

In an example embodiment directed toward achieving enhanced MPI reduction, a UV adhesive with a higher refractive index than inner and outer cladding regions 24 and 30 is used as blocking material 29. A higher-index UV adhesive causes a higher refractive index of the AL region 26 and creates a more leaky loss for the $LP_{11}$ mode in core 22. FIG. 9 is a plot of the calculated leaky loss (dB/m) at 1310 nm as a function of the refractive index of the blocking material in the form of a UV adhesive. The plot shows that the leaky loss increases when the refractive index of UV adhesive increases. For example, the leaky loss at a UV refractive index of 1.55 is about 3 times higher than the loss at a refractive index of 1.447, which matches the refractive index of inner/outer cladding regions 24 and 30.

Figure 10:
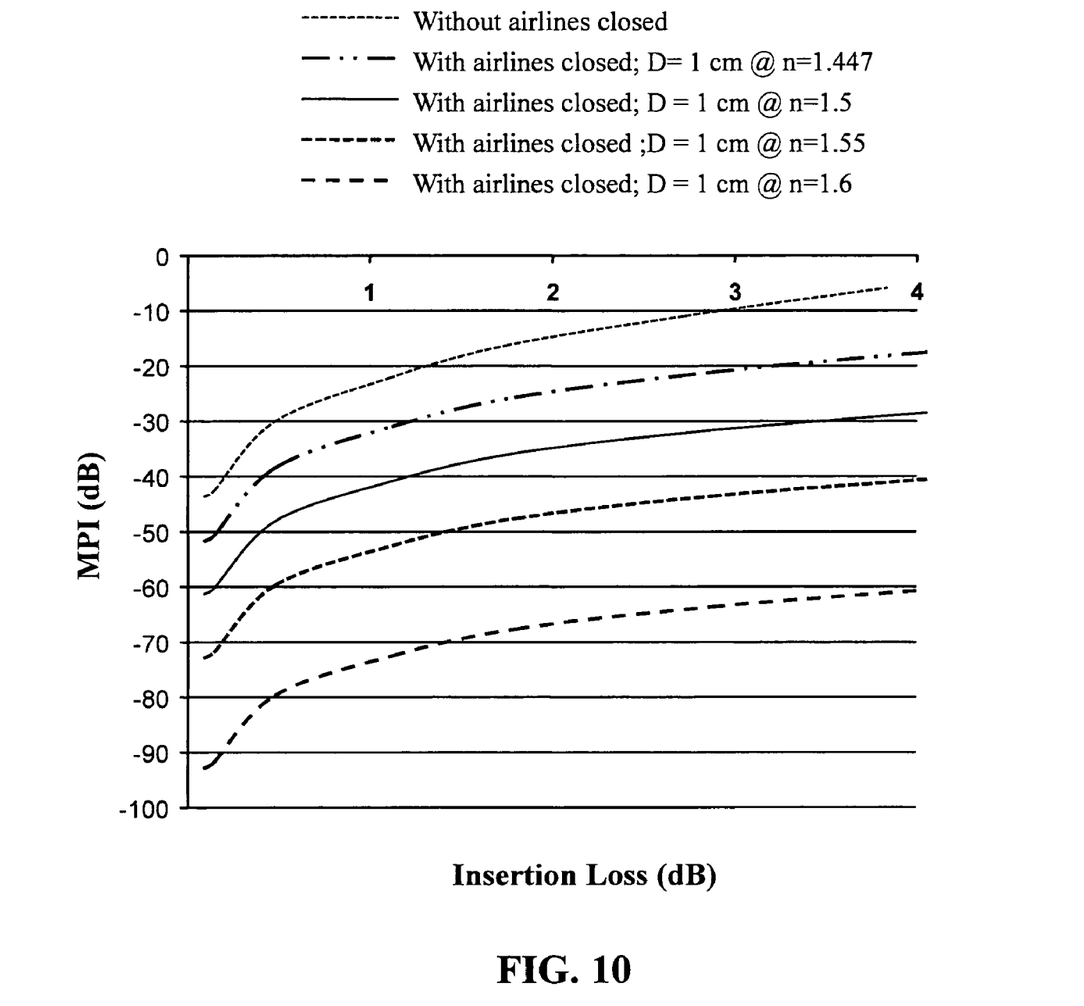
FIG. 10 is a plot of the MPI (dB) at 1310 nm versus insertion loss as a function of the refractive index of a UV curable adhesive blocking material for a two-meter AL fiber jumper.

A higher leaky loss of $LP_{11}$ mode reduces the MPI in AL jump fibers 10 and thus adds to their performance. FIG. 10 is a plot of the MPI (dB/m) at 1310 nm versus insertion loss as a function of the refractive index of the (adhesive) blocking material 29 for a two-meter (2 m) fiber jumper. At an index of 1.447, the MPI is reduced by about 10 dB as compared to the case without airlines 28 being closed. At an index of 1.5, the MPI is reduced by another 10 dB. An MPI below −40 dB is achieved with an index greater than 1.55.

Figure 11:
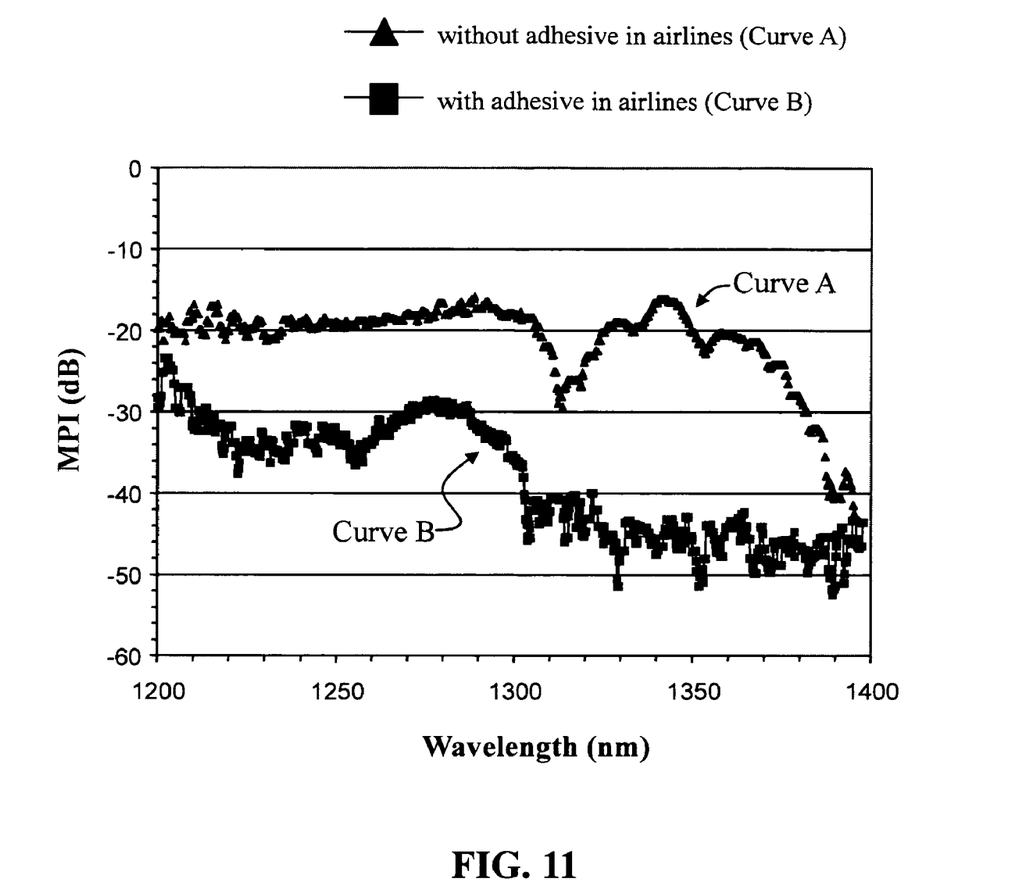
FIG. 11 is a plot of the measured MPI (dB) vs. wavelength (nm) for an AL fiber jumper having open airlines and another having closed (blocked) airlines at the fiber end section.

FIG. 11 is a plot of the measured MPI (dB/m) vs. wavelength (nm) for a one-meter (1 m) AL fiber 10 having open airlines 28 and another one-meter AL fiber 10 having closed (blocked) airlines at the AL fiber end section 10S. The insertion loss for the measurements was about 3 dB. The refractive index of the UV adhesive blocking material was 1.5. The plot shows that the MPI is reduced by about 20 dB at 1310 nm, which is in good agreement with the theoretical prediction.

The test sample used for making the measurements for the plot of FIG. 11 was prepared in two main steps. In the first main step, airlines 28 in a 1-meter-long section of AL fiber 10 were blocked at both ends using a UV-curable adhesive as blocking material 29. To accomplish this, opposite ends of a 1-meter-long section of AL fiber 10 were stripped and wiped clean with ethanol. Each end was then cleaved so that a stripped section of 22 mm to 25 mm was left at each end of the fiber for the alignment process. The bare fiber sections were bundled together and held in front of a heat gun for about 30 seconds at a distance 25 to 30 mm. This heated up the air in the airlines and created a vacuum. The stripped and heated sections of the fiber were then inserted into acetone and the heat source turned off. The AL fiber ends 11 and 12 were held in the acetone for about 5 minutes, allowing the acetone to wick into the airlines due to the vacuum therein and capillary action. The acetone serves to clean airlines 28 and reduces the surface tension of the glass, which facilitates the wicking process of the adhesive blocking material in the second step. Other adhesives and wetting agents can be used to reduce and/or adjust the surface tension.

After removing the fiber ends from the acetone liquid, the heat source was turned back on and the fibers were heated again to remove the acetone from airlines 28 to create a vacuum therein. The stripped and heated sections of the fiber were then inserted into the adhesive. The adhesive used was Dymax 401 Light Weld® (available from the Dymax Corporation, Torrington, CT), which is formulated for glass bonding and thus has the correct surface tension to wet the glass surface of the airlines. This adhesive also has a relatively low viscosity so that it wicks relatively quickly into airlines 28 via capillary action.

The fibers were removed from the adhesive after 45 minutes. During this time, the adhesive wicked into airlines 28 to a depth D of about 10 mm. The excess adhesive that collected on the surface of the stripped fiber was removed using an ethanol wipe. This is a critical step for subsequent operations such as connectorization. The adhesive that wicked into airlines 28 was then cured using a UV light source. The cure was performed for one minute from a distance of 50 mm.

Figure 12A:
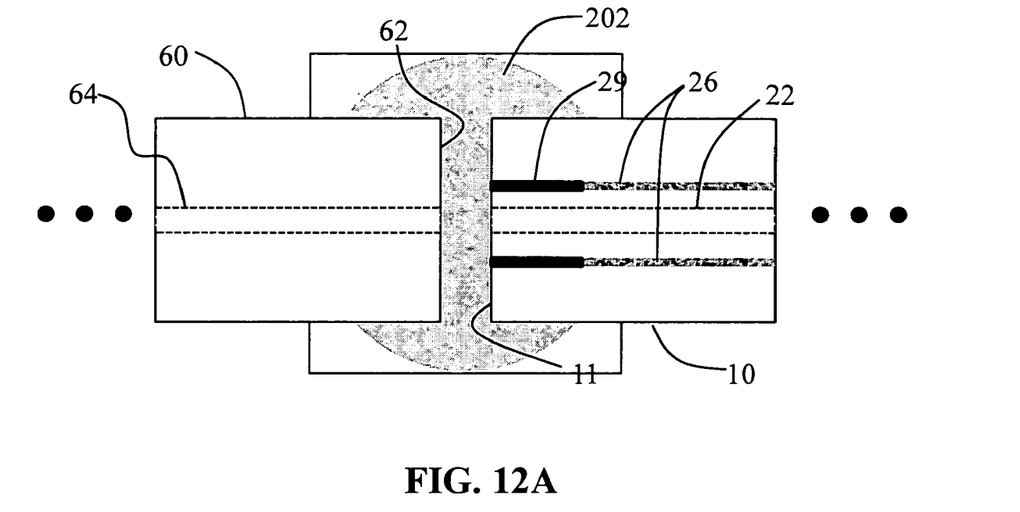
FIG. 12A is schematic side view of one end of an AL fiber having blocked airlines and being coupled to an end of a first non-AL fiber using an adhesive bead.

The second main step included aligning SMF-28e input and output fibers (e.g., input and output fibers 60 and 80 of FIG. 4) to the respective input and output ends 11 and 12 of the 1-meter-long Al fiber 10, prepared as described above. For this task, an alignment station capable of active monitoring of insertion loss was used. The alignment process included first measuring the maximum power through the 1-meter-long AL fiber 10. End 11 of the AL fiber 10 with blocked airlines 28 was then aligned to end 62 of input fiber 60 (e.g., a SMF-28e fiber) so as to align the respective cores 64 and 22 of the fibers. When the maximum pre-measured fiber power was reestablished, a bead 202 of a UV-curable adhesive was applied to the junction of the two fibers, as illustrated schematically in FIG. 12A. The index-matching adhesive used for blocking material 29 in this step was Ablestik OGRI50 THTG, available from Ablestik Laboratories, Rancho Dominguez, CA.

Figure 12B:
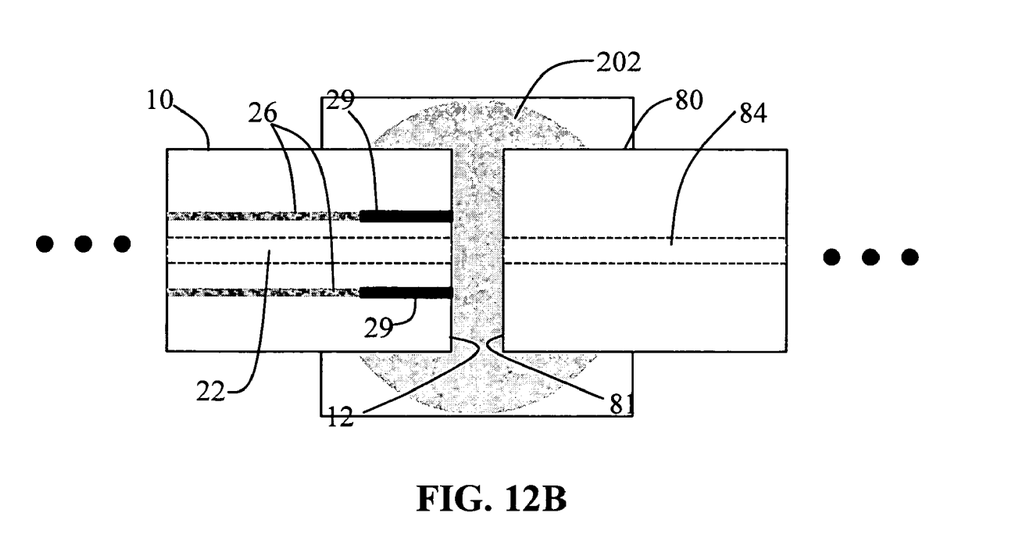
FIG. 12B is similar to FIG. 12A but showing the other end of the same AL fiber having blocked airlines and being coupled to a second non-AL fiber using an adhesive bead.

After adhesive 202 was applied, the alignment process was fine-tuned to return to the maximum power. Then one of the fibers was laterally offset, while maintaining the distance between the fiber end faces. Once the desired insertion loss was achieved, the adhesive was cured with UV light for 30 seconds. The curing distance was kept to 25-30 mm and the UV source was rotated around the adhesive bead 202 to ensure a uniform and complete cure on all surfaces. During this process, the transmitted power was monitored to ensure no loss change occurred. The same steps as described above were repeated to align end 12 of the one-meter-long AL fiber 10 to output fiber 80 (e.g., another SMF-28e fiber), as illustrated in FIG. 12B.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of forming an airline (AL) fiber that includes an AL region with airlines and an end section, and that has reduced multipath interference (MPI), comprising:
   preparing an end of the end section of the AL fiber to have open airlines; and
   introducing a blocking material into the open airlines such that the blocking material serves to attenuate one or more higher-order modes supported by the AL region.

2. The method of claim 1, wherein the blocking material includes a curable adhesive, and further including:
   allowing the adhesive to penetrate into the airlines to a desired depth; and
   curing the adhesive.

3. The method of claim 2, wherein the adhesive is ultraviolet (UV) curable, and further including curing the adhesive by exposure to UV light.

4. The method of claim 2, wherein allowing the adhesive to penetrate the airlines is accomplished by providing the adhesive in liquid form and using capillary action to draw the liquid adhesive into the airlines.

5. The method of claim 4, further including forming a vacuum in the airlines to enhance the effect of the capillary action.

6. The method of claim 1, wherein the AL fiber includes a cladding region adjacent the airline region and having a cladding refractive index, and wherein the blocking material has a refractive index substantially different than the cladding region refractive index.

7. The method of claim 1, including introducing the blocking material into the open airlines to a select depth D, wherein 1 cm $\leq$ D $\leq$ 2 cm.

8. The method of claim 1, wherein the AL fiber includes a cladding region adjacent the AL region and formed from a cladding material, the method further including:

heating the end section of the AL fiber so as to cause the cladding material at the end section to melt and fill the airlines and serve as the blocking material.

9. The method of claim 1, further including:
providing a fiber optic connector having a ferrule with a central channel; and
holding the end section of the AL fiber in the central channel.

10. The method of claim 1, wherein the airlines in the AL region are randomly arranged.

11. An airline (AL) jump fiber having reduced multipath interference (MPI), comprising:
an AL region arranged in operable relation to a core region such that the AL jump fiber is substantially insensitive to optical loss due to bending, and wherein the AL region is capable of supporting at least one higher-order optical mode; and
an end section that includes an end, wherein the airlines in the end section are filled with a blocking material so as to substantially attenuate the at least one higher-order mode supported by the AL region so as to reduce the MPI.

12. The fiber of claim 11, wherein the blocking material includes an adhesive.

13. The fiber of claim 12, wherein the adhesive is ultraviolet (UV) curable.

14. The fiber of claim 12, wherein the fiber includes a cladding region that has a refractive index and that is arranged immediately adjacent the AL region, and wherein the adhesive has a refractive index that is different than the cladding refractive index.

15. An optical fiber connector, comprising:
a ferrule having a ferrule channel adapted to hold the end section of the AL fiber of claim 11; and
a boot surrounding the ferrule channel, wherein the boot serves to support and protect an end section held by the ferrule channel such that the end section is not subject to severe bending.

16. The optical fiber connector of claim 15, wherein the ferrule channel is adapted to optically couple the end section with a second end section of a second AL fiber.

17. A method of optically coupling an airline (AL) fiber having an AL region that includes airlines to a second AL fiber that includes a second end section having a second end, comprising:
introducing a blocking material into the airlines at a first end section of the AL fiber so as to substantially attenuate at least one higher-order mode supported by the AL region;
supporting the first end section in a ferrule channel of a ferrule so a first end of the first end section resides in the ferrule channel; and
supporting the second end section in the ferrule channel so that the second end of the second AL fiber interfaces with the first end in the ferrule channel.

18. The method of claim 17, wherein introducing the blocking material includes wicking a curable adhesive into the airlines via capillary action.

19. The method of claim 18, wherein the adhesive is ultraviolet (UV) curable, and further including irradiating the adhesive with UV light to cure the adhesive within the airlines.

20. The method of claim 18, wherein the AL region is immediately adjacent a cladding region having a refractive index, and wherein the curable adhesive when cured has a refractive index different than the cladding region refractive index.

21. A method of reducing multipath interference in an airline (AL) fiber having an AL region with one or more airlines, comprising:
accessing a section of the AL fiber; and
closing at least one of the airlines in the section, wherein the closing of at least one of the airlines serves to attenuate one or more higher-order modes supported by the AL region.

22. The method of claim 21, wherein the closing of the at least one airlines comprises introducing a blocking material into the airline.

23. The method of claim 22, wherein the blocking material is introduced into the airline in multiple segments.

24. The method of claim 22, wherein introducing a blocking material comprises heating the section of the AL fiber so as to cause the section to melt and block the airline such that the melted AL fiber serves as the blocking material.

25. The method of claim 22, wherein the blocking material comprises an adhesive.

26. A method of reducing multipath interference in an airline (AL) fiber having an AL region with an AL refractive index and a cladding region with a cladding refractive index, comprising:
accessing a section of the AL fiber; and
causing the AL refractive index in the section to be at least as high as the cladding refractive index by introducing an adhesive into the airlines in the AL region.

* * * * *